UNITED STATES PATENT OFFICE.

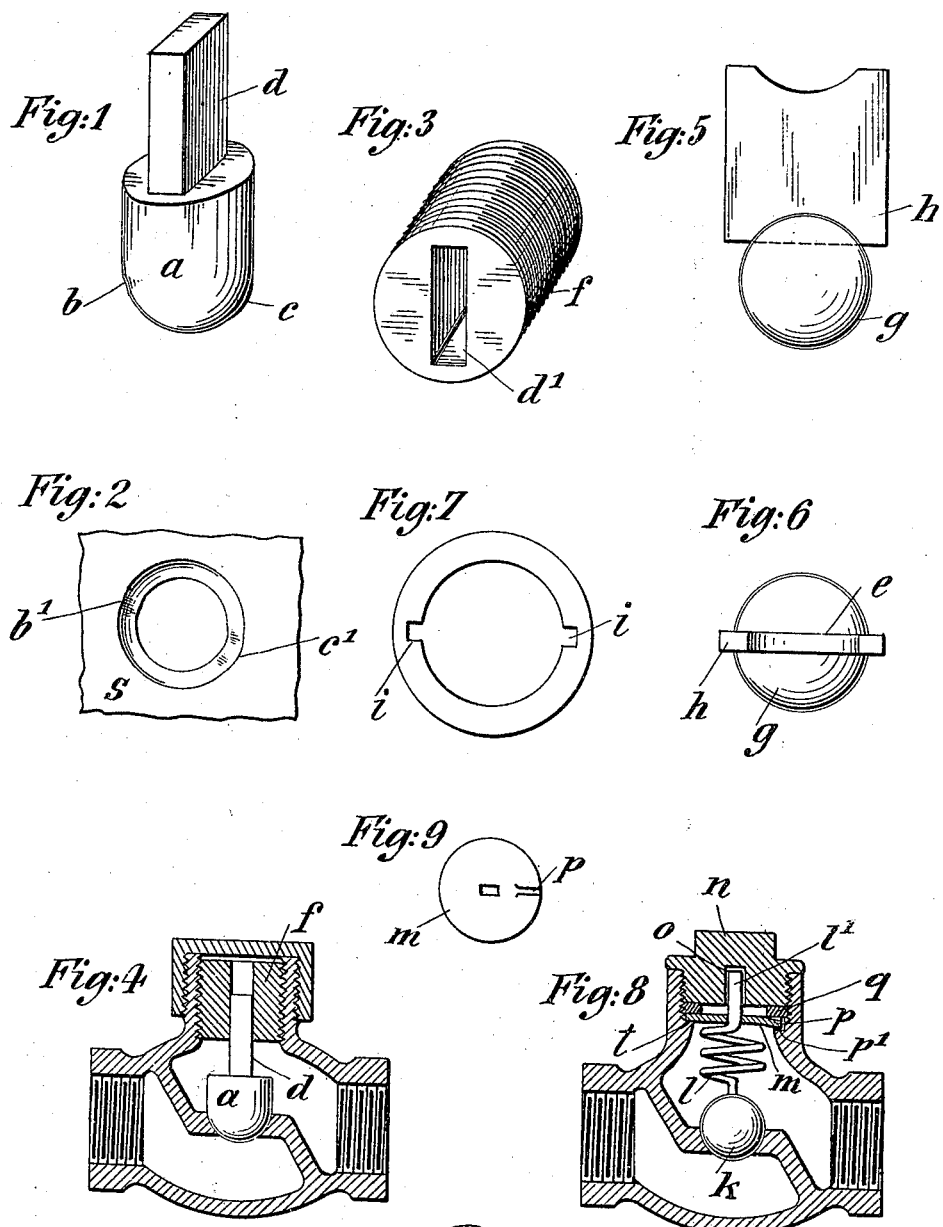

EDGAR ACKERMAN KELSEY, OF MOUNT VERNON, NEW YORK, ASSIGNOR OF ONE-HALF TO WALTER L. ABATE, OF NEW YORK, N. Y.

VALVE.

1,006,852.  Specification of Letters Patent.  Patented Oct. 24, 1911.

Application filed December 19, 1910. Serial No. 598,149.

*To all whom it may concern:*

Be it known that I, EDGAR A. KELSEY, a citizen of the United States, and a resident of Mount Vernon, county of Westchester, and State of New York, have invented certain new and useful Improvements in Valves, of which the following is a full, clear, and exact specification, reference being had to the accompanying drawings, wherein—

Figure 1 is an isometric view of one form of my improved valve, Fig. 2 a top view of the valve seat; Fig. 3 an isometric view of a bushing for the valve stem; Fig. 4 a vertical sectional view of a valve casing with the parts of the valve arranged therein; Fig. 5 is an elevation and Fig. 6 a top view of another form of my improved valve; Fig. 7 a top view of the neck of the valve casing; Fig. 8 is a sectional view of a valve casing with a ball spring valve, made according to my invention; the valve being shown in an elevation, and the valve seat in a sectional view; and Fig. 9 is a plan view of the washer used in connection therewith.

Heretofore valves were fitted into their seats by grinding; it is, however, a very tedious and difficult process in practice to fit a valve into its seat by grinding, so as to make it really fluid-tight, because of the difficulty, if not absolute impossibility, of producing a perfect spheroid, and the imperfections in the shape are apt to produce leakage. Moreover, the valve does not stay fluid-tight for very long, before needing to be reground, which greatly reduces the term of usefulness of such valves, and of course increases the costs of such valves and time and labor for fitting and refitting them.

The object of my invention is to produce a valve which is made to fit air-tightly into its seat without grinding, and which, after being thus fitted, is maintained in the position in which it was originally fitted into its seat. This is done, according to my invention, by setting the valve in, into its seat, in the position as the valve is intended to be maintained, and then pressing the valve in. Thereby whatever imperfections there may be in the shapes of the valve and of the seat, are reversely reproduced in the other. For instance, a bulge in the valve produces a corresponding depression in the seat; a depression in one part permits the metal of the other part to rise under the pressure of the parts surrounding the depression. It must, of course, be understood, that before thus fitting, the valve and its seat are shaped the same way as they are for grinding. It is, however, not necessary to do this work of shaping to such a degree of fineness as it is required to be done when the valve is to be fitted into its seat by grinding. Small valves may be fitted into their seats by a tap of a hammer, larger ones require correspondingly greater force to accomplish this, but it should be understood that it does not require any great force to fit even a large valve into its seat. For thus fitting ball-valves into their seats, it is advantageous to use a correspondingly shaped tool, to prevent flattening thereof by the stroke. By such compression, or driving in of the valve into its seat, whatever unevenness there might be in the seat, or in the valve, is impressed into, or reproduced reversely in the other part and the surfaces of the valve and of the seat, are made to correspond to each other as a matrix and a die. It does not make any difference whether the valve is produced of the same metal as the seat, or of a softer or a harder metal. I have experimented with valves and seats made of the same, and of softer and of harder metals, and have obtained a fluid-tight joint in all. The fitting of the valve into its seat by pressing it in, is based on the principle, that if two pieces of malleable metal are pressed together, with sufficient force, any protuberances or depressions on the contacting surface of each are reversely reproduced in the other, and thereby their contacting surfaces are formed so closely corresponding to each other, as to produce an air-tight joint. The fitting of the valve is illustrated as well as it can be shown in a drawing, in Figs. 1 and 2. It will be seen in Fig. 1 that the head *a* of the valve shows a depression at *b*. This depression was produced by the corresponding protuberances or unevenness, indicated *b'*, of the valve seat *s*, shown in Fig. 2. It will be further seen, that the head *a* of the valve (see Fig. 1) shows a slight protuberance at *c*, which corresponds with the dent, marked *c'*, in the seat *s* of the valve shown in Fig. 2. These deviations from the correct spherical shape, are shown somewhat exaggerated for the purpose of illustration. In practice the deviations are not so marked or apparent as they are made in the drawing; the object thereof being to illustrate how the valve and the seat are fitted together according to my invention.

For setting the valve always into the position, in which it was fitted into its seat, or in other words, to prevent its turning, or shifting out of the position; when it is raised from, or lowered into, its seat, variously constructed devices may be employed, some of which are illustrated in the above-described drawings. The device shown in Figs. 1 and 2 comprises the square stem $d$ of the valve and the bushing $f$ shown in Fig. 3, which is screwed into the neck of the valve casing. The bushing $f$ is provided with a longitudinal bore $d'$, corresponding in shape to the stem $d$. The bushing $f$ is firmly screwed in, in the valve casing, stem $d$ and the bushing $f$ then hold it in the same position relatively to the seat $s$ as it was originally fitted. In practice the stem $d$ of the valve $a$ is inserted in the bushing $f$ and the latter screwed into the valve casing before the valve is fitted into its seat. Then a suitably shaped tool is set upon the stem $d$ and hit by a hammer. One or two taps with a hammer upon the head of the tool, will be sufficient to produce a fluid-tight fitting of the valve into its seat. The stem $d$ and the bushing $f$ then hold it in the position, in which it was thus fitted. In Figs. 5 and 6 a somewhat different means is shown for this purpose. In this device the ball-valve $g$ is combined with the plate $h$ of greater width than the diameter of the valve $g$, and guide-ways $i$ are cut in the plug hole of the valve casing. Plate $h$ is secured in the slot $e$, milled in the valve $g$, and the projecting parts of the plate enter into the grooves $i$ cut in the plug-hole of the valve casing. Thereby the valve is maintained in the position, in which it was fitted into its seat.

The spherical valve $k$ shown in Fig. 8 is held against turning by the flattened end $l'$ of the spring $l$, which engages in a corresponding aperture of washer $m$. This washer is held in its position, in the valve casing, by the ridge $p$ registering with a corresponding notch $p'$ in the shoulder $t$ of the bore in the casing and by the packing ring $q$ pressed thereon by the valve plug $n$ when screwed in or upon the casing. The plug $n$ may be hollow or provided with a recess $o$ to accommodate the flattened end of spring $l$ projecting through the washer $m$.

Various other means, besides those herein shown and described, may be employed for fixing the variously constructed valves in the position in which they are fitted into their seats as hereinbefore set forth.

When assembling a valve of this kind or setting it into the casing, the valve $k$, affixed to the spring $l$, is set in. Then a tool, having its lower end shaped to fit over the valve and slotted to admit the bent end of spring $l$, is set thereon and tapped with a hammer. This fits the valve $k$ into its seat $s$. The notch $p'$, having been made in the shoulder $t$ of the bore in the casing, the washer $m$ is slid upon the flattened end $l'$ of the spring $l$ and ridge $p$ is made therein by setting a chisel upon the edge of the washer over the notch $p'$ and hitting it with a hammer. By that the valve is fixed in the position in which it was fitted into its seat. Then the packing ring $q$ is inserted and finally plug $n$ is screwed in.

I claim as my invention:

1. The process of fitting valves into their seats which consists in pressing one upon the other, whereby the imperfections in the shape of each are reversely reproduced in the other.

2. A valve and a valve seat, the imperfections in the shape of the seat being reversely reproduced on the valve and the imperfections in the shape of the valve being reversely reproduced in the seat, and means for guiding the valve to seat it in the same position in the seat, in which it was fitted therein.

3. A valve casing, a valve and a valve seat, the valve and the valve seat having each the imperfections in shape of the other reversely reproduced by pressing them together; an angularly cross-sectioned stem on the valve; means secured in the neck of the valve casing and having an angular aperture therein fitted on the same.

EDGAR ACKERMAN KELSEY.

Witnesses:
 A. F. SPIEGEL,
 EMMA SCHLUETER.